United States Patent Office 2,941,327
Patented June 21, 1960

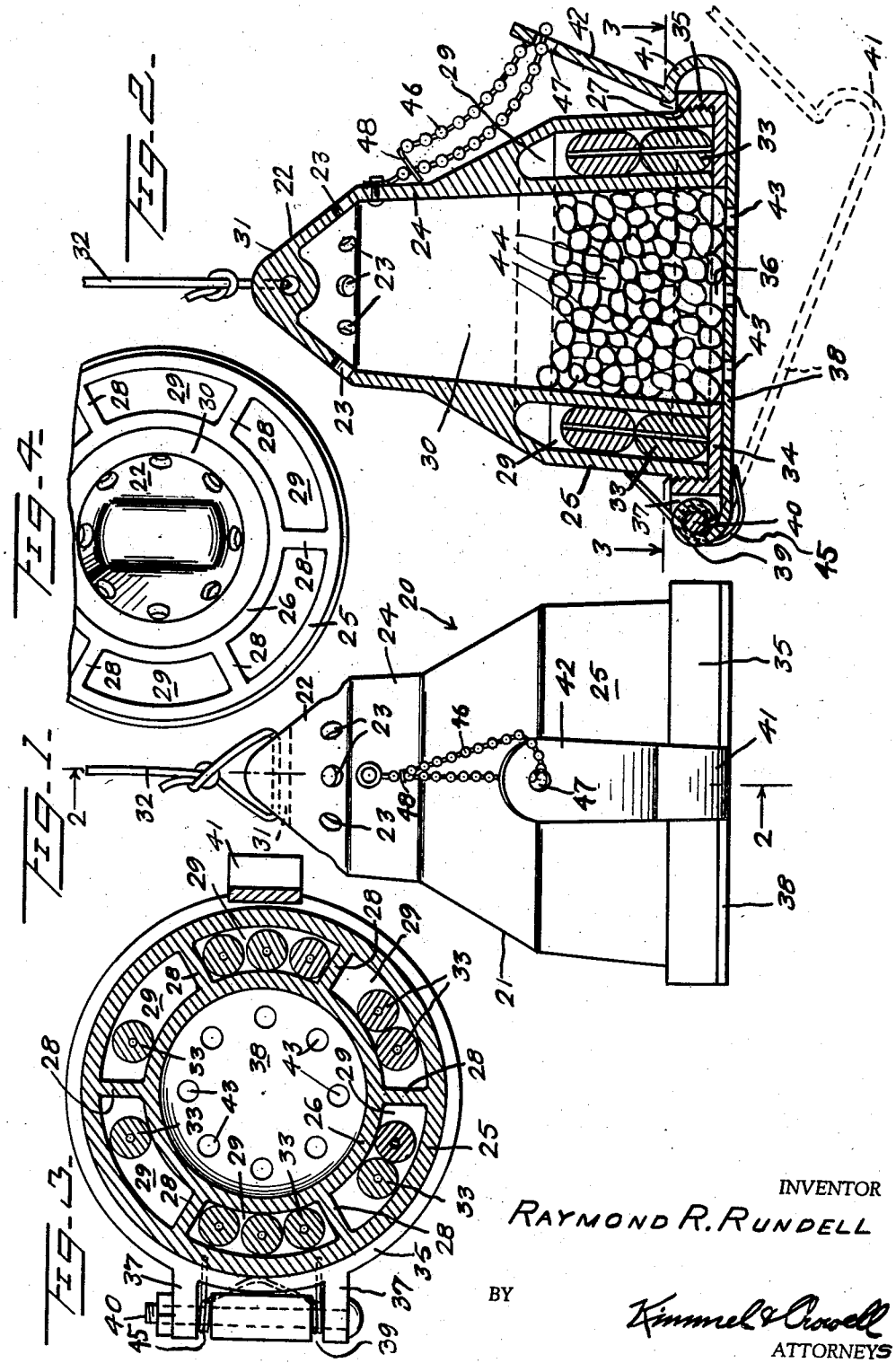

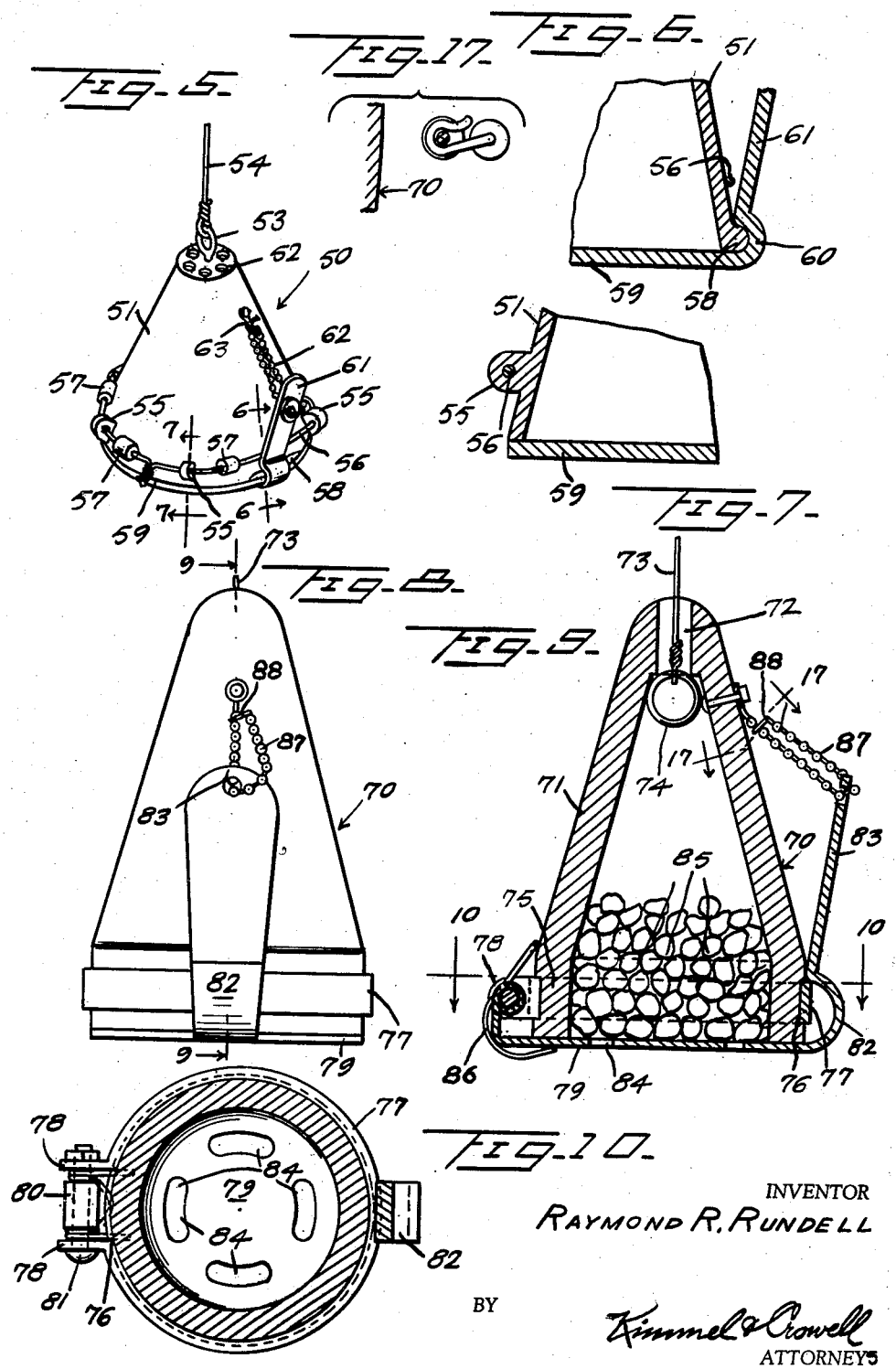

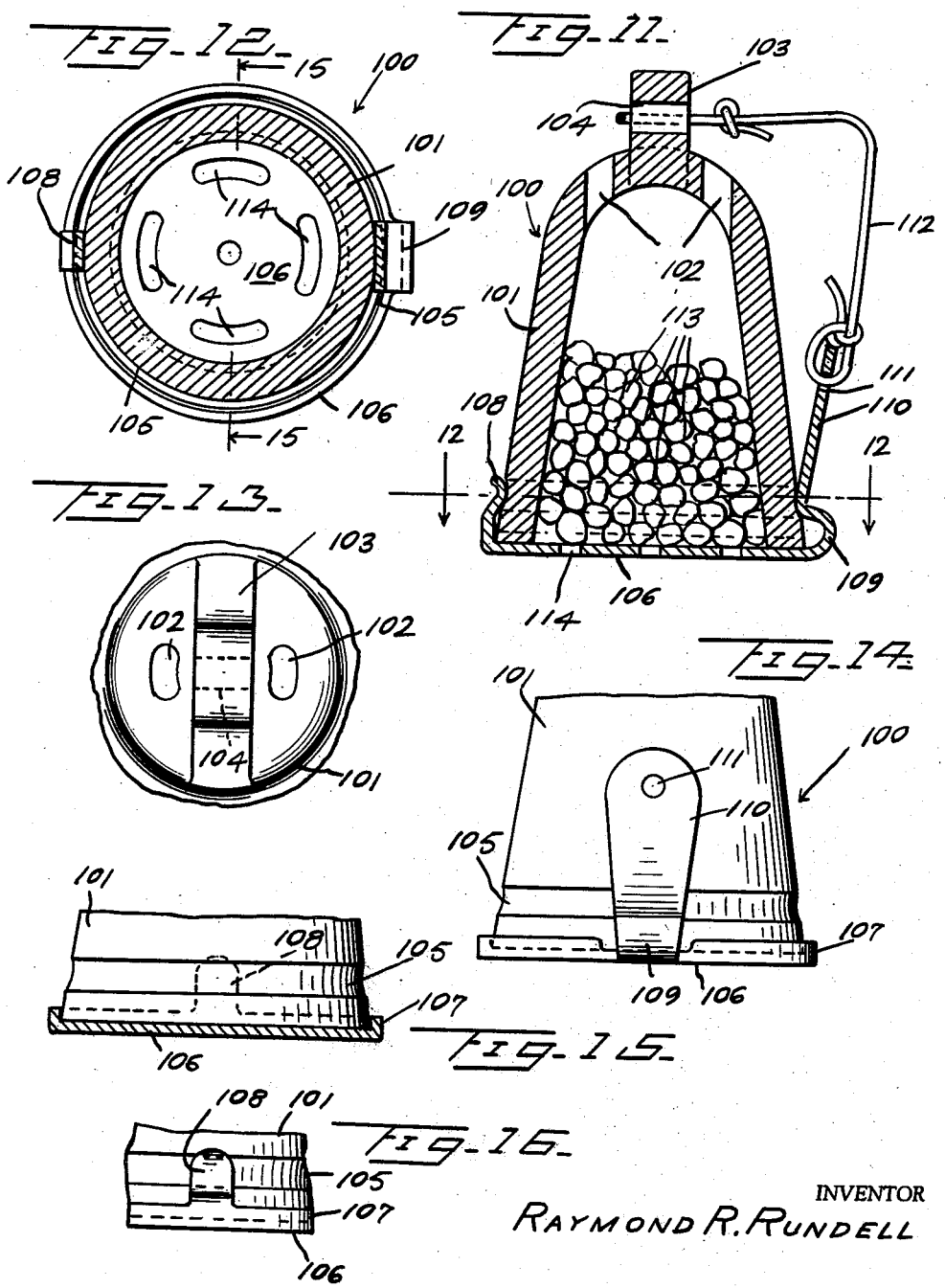

2,941,327
FISHING CHUM POT
Raymond R. Rundell, 127 NW. 17th Place, Miami, Fla.
Filed Dec. 16, 1958, Ser. No. 780,887
4 Claims. (Cl. 43—44.99)

The present invention relates to fishing chum pots and particularly to such pots which are adapted to deposit chum at selected points well beneath the surface of the water.

The primary object of the invention is to provide a fishing chum pot from which chum may be deposited at a desired depth in desired quantities quickly and easily under the complete control of the fisherman.

Another object of the invention is to provide a fishing chum pot of the class described above in which the chum may be conveniently loaded prior to depositing beneath the surface of the water.

A further object of the invention is to provide a fishing chum pot having means for automatically discharging a portion of the chum therefrom on a reverse rapid upward movement of the chum pot.

A still further object of the invention is to provide a fishing chum pot of the class described above in which the relative buoyancy of the chum pot may be adjusted as required.

Other objects and advantages will become apparent in the following specification when considered in light of the attached drawings, in which:

Figure 1 is a side elevation of the preferred form of the invention;

Figure 2 is a vertical sectional view taken along the line 2—2 of Figure 1, looking in the direction of the arrows;

Figure 3 is a horizontal sectional view taken along the line 3—3 of Figure 2, looking in the direction of the arrows;

Figure 4 is a bottom plan view with the covers removed;

Figure 5 is a perspective view of a modified form of the invention;

Figure 6 is an enlarged fragmentary vertical section taken along the line 6—6 of Figure 5, looking in the direction of the arrows;

Figure 7 is an enlarged fragmentary vertical section taken along the line 7—7 of Figure 5, looking in the direction of the arrows;

Figure 8 is a side elevation of another modified form of the invention;

Figure 9 is a vertical sectional view taken along the line 9—9 of Figure 8, looking in the direction of the arrows;

Figure 10 is a horizontal sectional view taken along the line 10—10 of Figure 9, looking in the direction of the arrows;

Figure 11 is a vertical sectional view of still another modified form of the invention;

Figure 12 is a horizontal section taken along the line 12—12 of Figure 11, looking in the direction of the arrows;

Figure 13 is a fragmentary top plan view of the construction illustrated in Figure 11;

Figure 14 is a fragmentary side elevation of the structure of Figure 12;

Figure 15 is a fragmentary transverse sectional view taken along the line 15—15 of Figure 12, looking in the direction of the arrows;

Figure 16 is a fragmentary side elevational view of the invention as seen from the side opposite to Figure 14; and Figure 17 is an enlarged fragmentary sectional view taken on line 17—17 of Figure 9, looking in the direction of the arrows.

Referring now to the drawings in detail wherein like reference characters indicate like parts throughout the several figures, the reference numeral 20 indicates generally a chum pot constructed in accordance with the invention.

The chum pot 20 includes a body 21 having a conical top wall 22 through which a plurality of apertures 23 extend. An annular wall 24 is integrally secured to and depends from the conical top wall 22 and has an outer annular wall 25 and an inner annular wall 26 integrally depending therefrom in spaced apart concentric relation. The outer annular wall 25 is externally threaded at 27 along the lower edge thereof. A plurality of radially extending partitions 28 extend between and integrally connect the outer annular wall 25 and the inner annular wall 26 to form a plurality of chambers 29 which open through the bottom of the body 21.

The annular wall 24 and the inner annular wall 26 along with the conical top wall 22 define an open bottom inner chamber 30 of a size considerably larger than the chambers 29. The conical top wall 22 has a transversely extending bore 31 formed therein through which a tether line 32 is passed to secure the chum pot 20 to the boat.

Weights 33 in any required quantity are positioned in the chambers 29 to overcome the buoyancy of the chum pot 20 to cause it to sink to the desired depth and to compensate for various currents encountered so that the chum pot 20 will bottom in the fishing area.

A cover plate 34 having an internally threaded upstanding annular flange 35 integrally formed thereon is secured to the threads 27 on the outer annular wall 25 to hold the weights 33 in the chamber 29. The cover plate 34 has an aperture 36 formed therein underlying the chamber 30. A pair of spaced apart parallel ears 37 are integrally formed on the flange 35 of the cover plate 34, as can be best seen in Figure 3. A generally flat closure 38 is provided with a hinge barrel 39 at one side thereof and a pivot bolt 40 hingedly secures the hinge barrel 39 to the ears 37. The closure 38 at the side edge thereof opposite the hinge barrel 39, is provided with an arcuate resilient latch 41 arranged to engage over the upper edge of the flange 35 to releasably secure the closure 38 in position to close the bottom of the chamber 30.

An upwardly and outwardly sloping cam plate 42 is integrally formed on the upper end of the latch 41, for reasons to be assigned. The closure 38 is provided with a plurality of apertures 43 to permit a flow of water through the chamber 30, the water passing outwardly through the apertures 23.

Chum 44 is loaded into the chamber 30 and the closure 38 is moved to the full line position, illustrated in Figure 2. By means of the tether line 32 the chum pot 20 is then lowered to the desired depth below the surface of the water and then the tether line is drawn rapidly upwardly so that the pressure of the water on the cam plate 42 will disengage the latch 41 from the flange 35 to open the closure 38 and discharge a portion of the chum 44 therefrom. A coil spring 45 is mounted on the pivot bolt 40 and normally maintains the closure 38 in closed position. The spring 45 returns the closure 38 to closed position after each actuation thereof.

By having the apertures 43 and 23 to provide a flow of water through the chum 44, a trail can be laid in the water which will be followed by the fish to the point where the chum is dumped.

An adjustable chain 46 is secured to the annular wall 24 and extends through an opening 47 in the cam plate 42, properly positioning the hook 48 of the chain 46 the degree of opening of the closure 38 is readily regulated.

Referring now to the modification illustrated in Figures 5 through 7, a chum pot generally indicated at 50 includes a hollow conical body 51 having a perforate top wall 52 through which an attaching eye 53 is secured. A tether line 54 is secured to the attaching eye 53 to connect the chum pot 50 to a boat. The body 51 has a plurality of ears 55 integrally formed adjacent the lower edge thereof and an annular wire support 56 is threaded through the ears 55 and has a plurality of sinker weights 57 threaded thereon.

The body 51 has an integral outwardly extending flange 58 formed on its lower edge and is provided with a spring biased closure plate 59 hingedly secured to the body 51. An arcuate resilient latch 60 is formed on the closure plate 59 and engages over the flange 58 to releasably secure the closure 59 in closed position. A cam plate 61 is integrally formed with the arcuate latch 60 and extends upwardly and outwardly therefrom. An adjustable chain 62 is secured to the body 51 passing through the cam plate 61 and is releasably supported by a hook 63 on its terminal end, as seen in Figure 5.

The use and operation of the modification illustrated in Figures 5 through 7 is identical to that of the preferred form of the invention with the closure 59 being opened in the same manner as the closure 38.

In the modification illustrated in Figures 8 through 10, a chum pot 70 includes an open bottomed hollow body 71 having a bore 72 extending through the upper end thereof. A tether line 73 extends through the bore 72 and is connected to a ring 74 of a size too large to pass through the bore 72. The body 71 has a cylindrical lower portion 75 and an annular groove 76 is formed in the outer surface thereof. A generally circular band 77 is seated in the groove 76 and is provided with a pair of spaced apart parallel ears 78 integrally formed on the opposite ends thereof. A closure plate 79 is positioned adjacent the lower end of the body 71 and has a hinge barrel 80 integrally formed thereon and positioned between the ears 78. A pivot bolt 81 hingedly secures the hinge barrel 80 to the ears 78 to hingedly secure the closure plate 79 to the body 71.

An arcuate resilient latch 82 is integrally formed on the closure plate 79 oppositely of the hinge barrel 80 and is adapted to engage over the upper edge of the band 77, as seen in Figure 9, to releasably secure the closure plate 79 in engagement with the bottom of the body 71.

An elongated upwardly and outwardly sloping cam plate 83 is integrally formed on the resilient latch 82 to operate the closure 79 in the same manner as the cam plate 42 operates the closure 38 in the preferred form of the invention. The closure plate 79 is provided with a plurality of apertures 84 which cooperate with the bore 72 to permit a passage of water through the body 71 in contact with the chum 85 contained therein.

A coil spring 86 is mounted on the pivot bolt 81 to normally bias the closure 79 to closed position. An adjustable chain 87 is secured to the body 71 and passes through the cam plate 83. A hook 88 secures the terminal end of the chain 87 in adjusted position.

In the modification illustrated in Figures 11 through 16, a chum pot, induciated generally at 100, includes an open bottom hollow body 101 having a plurality of apertures 102 in the upper end thereof. A boss 103 is integrally formed on the upper end of the body 101 and has a transversely extending bore 104 formed therein.

A tether line (not shown) is adapted to be connected to the boss 103 through the bore 104 to secure the chum pot 100 to a boat. The body 101 adjacent the lower edge thereof is provided with an annular groove 105, as can be best seen in Figure 14, to assist in connecting a closure plate 106 to the chum pot 100. The closure plate 106 has an upstanding annular flange 107 formed thereon to engage over the lower side edges of the body 101 to prevent the closure plate 106 from being laterally displaced with respect to the body 101.

The closure plate 106 is provided with an upstanding arcuate resilient prong 108 which projects upwardly from the flange 107, as can be best seen in Figure 16. The prong 108 engages in the groove 105 to assist in maintaining the closure plate 106 in engagement with the lower end of the body 101. An arcuate resilient latch 109 is integrally formed on the edge of the closure plate 106 opposite the prong 108. The latch 109 also engages in the groove 105 so that the closure plate 106 is releasably secured to the body 101.

An upwardly and outwardly sloping cam plate 110 is integrally secured to the latch 109 and has a bore 111 formed therein. A relatively short flexible line 112 has its opposite ends tied through the bores 111, 104, respectively, to secure the closure plate 106 to the body 101 to prevent its loss when disconnected from the body 101.

The hollow body 101 is filled with the desired amount of chum 113 and the closure plate 106 is then snapped into closed position against the bottom thereof, as illustrated in Figure 11. The chum pot 100 is then lowered to the desired position with water circulating therethrough, passing through apertures 114 in the closure plate 106 and the apertures 102 in the body 101. Upon reaching the desired depth, the chum pot 100 is raised quickly and the pressure of water on the cam plate 110 detaches the resilient latch 109 from the groove 105 so that the closure plate 106 becomes detached from the bottom of the body 101 to permit the chum 113 to be dumped therefrom.

The flexible line 112 retains the closure plate 106 tethered to the body 101 to prevent its loss.

It should be noted that in all forms of the invention the bottom closures are also held in closed positions during the lowering of the device by pressure of the water through which the device is moving.

In addition to the use of the device as described above, it may also be used as a lure by forming the device from transparent material and placing live bait, such as shiners or shrimp, therein and lowering the device to the bottom.

Having thus described the preferred embodiments of the invention, it should be understood that numerous structural modifications and adaptations may be resorted to without departing from the scope of the appended claims.

What is claimed is:

1. A chum pot comprising an open bottom body, a closure plate arranged to close the bottom of said body, a resilient latch integrally forced on said closure plate for releasably securing said closure plate in closed position with respect to said body, an upwardly and outwardly sloping cam plate integrally secured to said latch to actuate said latch and release said closure plate from closed position upon rapid upward movement of said chum pot through the water, said chum pot having a plurality of weight receiving chambers formed therein and a threaded cover releasably closing the lower ends of said chambers.

2. A device as claimed in claim 1 wherein said closure and said cover are hingedly secured together.

3. A chum pot comprising an open bottom body, a closure plate arranged to close the bottom of said body, a resilient latch integrally formed on said closure plate for releasably securing said closure plate in closed position with respect to said body, an upwardly and outwardly sloping cam plate integrally secured to said latch to actuate said latch and release said closure plate from closed position upon rapid upward movement of said chum pot through the water, a plurality of radially outwardly extending ears formed on said chum pot, an annular wire extending through and supported by said ears and a plurality of weights supported on said annular wire.

4. A chum pot comprising an open bottom body, a closure plate arranged to close the bottom of said body, a resilient latch integrally formed on said closure plate for releasably securing said closure plate in closed position with respect to said body, an upwardly and outwardly sloping cam plate integrally secured to said latch to actuate said latch and release said closure plate from closed position upon rapid upward movement of said chum pot through the water, a resilient prong formed on said closure plate oppositely of said resilient latch, said body having an annular groove formed therein with said prong and said latch releasably engaging in said groove to releasably secure said closure plate in engagement with the open end of said body.

References Cited in the file of this patent
UNITED STATES PATENTS

| | | |
|---|---|---|
| 1,470,842 | Hyams | Oct. 16, 1923 |
| 1,807,712 | Spofford | June 2, 1931 |